(No Model.) 2 Sheets—Sheet 2.

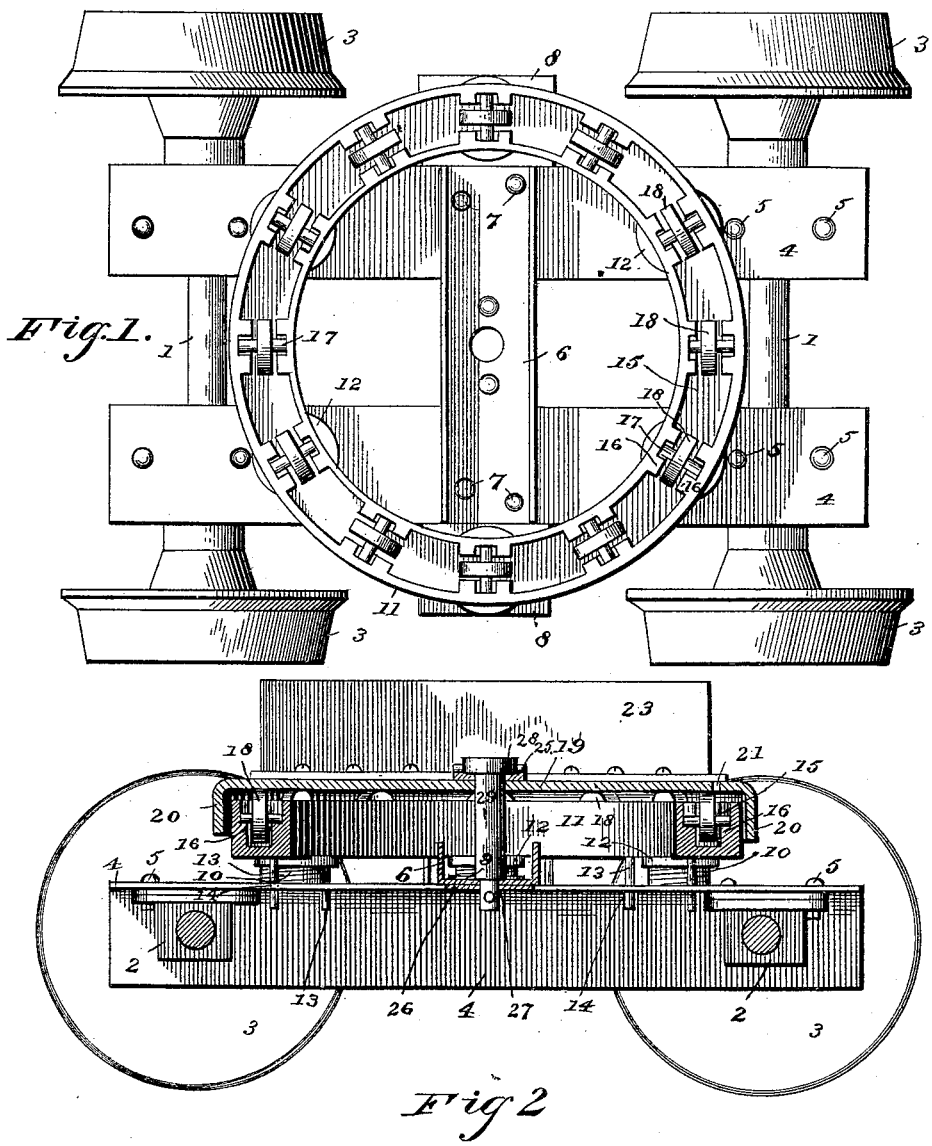

D. KING.
CAR TRUCK.

No. 500,008. Patented June 20, 1893.

Witnesses
J. Ulke Jr.
J. H. Siggers

Inventor
Daniel King
By his Attorneys,
C A Snow & Co.

UNITED STATES PATENT OFFICE.

DANIEL KING, OF FINKSBURG, MARYLAND.

CAR-TRUCK.

SPECIFICATION forming part of Letters Patent No. 500,008, dated June 20, 1893.

Application filed January 21, 1893. Serial No. 459,257. (No model.)

*To all whom it may concern:*

Be it known that I, DANIEL KING, a citizen of the United States, residing at Finksburg, in the county of Carroll and State of Maryland, have invented a new and useful Car-Truck, of which the following is a specification.

My invention relates to improvements in car trucks and has particular reference to the trucks of tram cars; and furthermore, as an improvement upon United States Patent No. 467,009, granted me January 12, 1892.

The main objects of my present improvement are, first, to so construct the truck as to secure a maximum strength and at the same time simplicity and convenience; also to reduce the height, weight and cost of construction and repairs.

With these various objects in view the invention consists in certain features of construction hereinafter specified and particularly pointed out in the claims.

Figure 3:
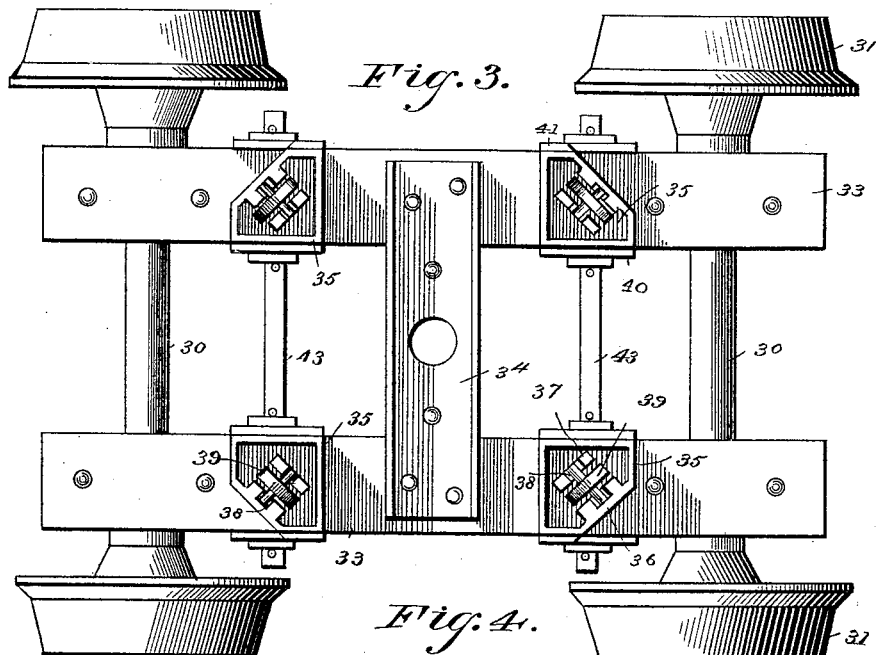
Figure 4:
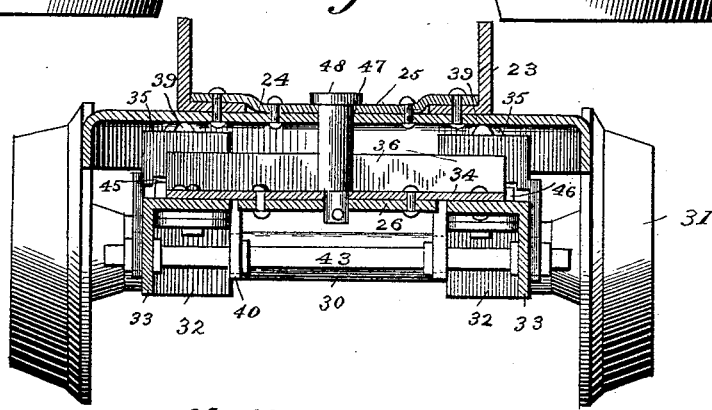
Figure 5:
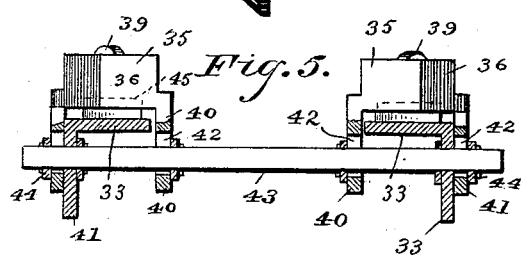
Figure 6:
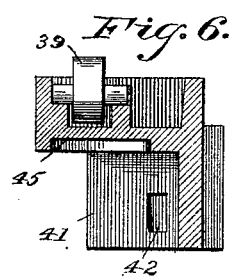

Referring to the drawings:—Figure 1 is a plan view of a truck embodying my invention. Fig. 2 is a longitudinal sectional view of the same. Fig. 3 is a plan view of a slightly modified construction. Fig. 4 is a transverse sectional view of the same. Fig. 5 is a detail in transverse-section of the angle-beams, the roller frames thereon, and the tie-rods for securing said roller frames. Fig. 6 is a detail in section of one of the roller frames.

Like numerals of reference indicate like parts in all the figures of the drawings.

Referring particularly to Figs. 1 and 2, 1—1 designate the usual journals or axles, which are located in the usual journal-boxes 2, and are provided beyond the same with the wheels 3.

4—4 designate a pair of longitudinally-disposed parallel beams, the same being formed of angle-plates, and these beams have their upper sides or horizontal portions bolted as at 5, to the aforesaid journal-boxes, their vertical portions either extending down inside the boxes, between the boxes and wheels, or outside of said wheels, but in the present instance, being located between the wheels and the boxes, and penetrated by the axles, for which purpose the said beams have their inner branches provided with openings through which the said axles are passed previous to the application of the wheels; or any other means may be provided for securing the axles to the beams. The beams are connected by a transverse channel-beam of a general U-shape in cross-section, and designated as 6, bolts or rivets 7, being employed in forming the connection. To the outer vertical sides or branches of the angular beams 4 are bolted opposite angular extension-plates 8, which are located between the wheels, and best shown in Fig. 1.

Supported by springs or cushions rising from the beams and extension plates 8 is a circular roller-frame 11, the same being U-shaped in cross-section, and having formed upon its under side at intervals spring-receiving seats 12. These seats 12 receive the upper ends of the springs 10, so that as will be apparent, the circular frame is yieldingly supported upon the beams 4. The frame is provided at intervals with depending pins 13, whose lower ends extend through guide-openings 14, formed in the horizontal portions or branches of the angle-beams 4, whereby the vertical oscillations of the roller-frame 11 will not tend to give the frame a lateral vibration, but the same will be held to move only in a vertical direction.

The circular frame 11 by reason of its shape, is provided upon its upper side with an annular oil-groove 15, the same being continuous, and the walls of said groove are provided at intervals with radially-opposite bearing-lugs 16, best shown in Fig. 1. In each pair of radially-opposite bearing lugs 16, there are journaled the trunnions 17, of a loose roller 18, whose upper surface is above that of the roller-frame but whose trunnions are below the upper edge of said roller-frame, so that when the oil-groove 15, before mentioned, is partially or wholly filled with oil the journals or trunnions of the aforesaid rollers are immersed, or in other words, the rollers run in oil, whereby a constant lubrication of these parts is the result.

19 designates a turn-table, the same being circular and slightly greater than the diameter of the roller-frame, the said turn-table being provided at its edge with a depending circular flange 20 which embraces the exterior wall of said frame, and hence tends to exclude dust from the oil-groove and roller-bearings. The frame is provided at suitable points with oil-openings or perforations 21, through which oil may be introduced into the groove when required.

Bolted as at 22, to the upper side of the turn-table and above the angular beams 4, is a pair of opposite L-shaped or angular plates 23, whose vertical branches or walls are designed to engage the under side of the anchoring frame-work of the car in the usual manner. These angular plates have their horizontal portions connected at their centers by means of a transverse plate 25, best shown in Fig. 4, the center of which is slightly depressed between the plates 23 so as to take against the upper side of the turn-table, whereby at this point, a double thickness of metal results. A strengthening and reinforcing-plate or washer 26, is located between the horizontal branches of the angular beams 4, upon the under side of the transverse connecting-plate 6, and the said connecting-plate and reinforcing-plate 26, are provided with a registering opening or pin-hole 27, which is vertically below a corresponding pin-hole 28, formed in the center of the turn-table 19 and the reinforcing plate 25. Through these pin-holes 27 and 28 is passed a king-bolt 29, whose head rests upon the plate 26 and whose lower end depends through the perforation 27.

In Figs. 3 to 6, I have illustrated a modified construction of truck for lighter loads. Referring to these figures, it will be seen that 30 designates the axles, 31 the wheels, 32 the boxes in which the axles are journaled, and 33 the angular beams, the same as in the previous instance; said beams being connected at their centers by the U-shaped channel-beam 34 bolted to the beams. In this construction I omit the roller-frame, and substitute therefor a series of, (in this instance,) four boxes 35. These boxes have their outer corners removed or in other words have a diagonal outer side-wall 36, and within the walls opposite said side-wall, a bearing-lug 37, which is opposite the side wall 36. Bearing-recesses 38, are formed in these lugs and diagonal walls, and in the same are journaled the trunnions of rollers 39, said trunnions being considerably below the upper edges of the boxes, so that when the boxes are either partially or wholly filled with oil the trunnions will be immersed in the lubricant. The boxes are provided at their inner sides with depending flanges 40 and at their outer sides with depending flanges 41. The inner flange 40 depends below the inner edge of the angular beam 33 while the outer flange 41 depends below the vertical flange of said beam 33. The two flanges 40 and 41 are provided with openings 42, which are vertically-disposed, and through these openings 42 and corresponding openings formed in the angular beams 33, transverse tie-rods 43 are passed, the same being provided at their outer sides with nuts 44, all as best shown in Figs. 4 and 5 of the drawings. The under sides of the boxes have formed therein countersunken spring receiving seats 45, and corresponding seats may or may not be formed upon the upper sides of the beams, as is also the case with reference to the construction shown in Fig. 1 of the drawings, and between these seats are interposed the springs 46. In this instance, there is also employed the turn-table 47, upon which are mounted the opposite angular plates 23, the reinforcing connecting-plate 25, and the lower reinforcing plate 26, all as before mentioned. The said plates 25 and 26, together with the turn-table and connecting-plate 24, have a bolt-receiving opening 47, for the reception of the king-bolt 48. This completes the construction of the truck, and it will be seen that the same is light, yet exceedingly strong, rigid and durable, whereby it is adapted for easy running; contains but few parts, and consequently may be kept in repair at a slight cost; and furthermore, that the entire truck is so condensed vertically as to be considerably lower than the construction of truck described in my former patent.

It will be understood that changes in the form, proportion and the minor details of construction may be resorted to without departing from the principle or sacrificing any of the advantages of this invention.

It will be understood that in the present instance the wheels of the axles are meant to rotate thereon, but in instances where the axle and wheels are made rigid or the latter are compressed upon the former other provisions may be made for securing the beams upon the axles, as for instance, the beams may be notched or recessed in their lower edges for the reception of the axles.

Having described my invention, what I claim is—

1. In a car-truck, the axles, wheels and journal boxes, in combination with the pair of longitudinally-disposed parallel beams 4 formed of angle-plates and connecting the axles, and having their vertical portions penetrated by the axles, and their horizontal portions bolted to the journal-boxes, substantially as described.

2. In a car-truck, the axles, wheels and journal-boxes, in combination with the pair of longitudinally-disposed parallel beams 4 formed of angle-plates and connecting the axles, and having their vertical portions penetrated by the axles, and their horizontal portions bolted to the journal-boxes, and the transverse channel-beam 6 connecting the longitudinal beams, substantially as described.

3. In a car-truck, the roller-frame or boxes having a closed bottom and an open top, and the rollers seated in the frame or boxes with their upper surface above the roller-frame or boxes and their trunnions below the upper edge of the latter, whereby when the frame or boxes are supplied with oil, the trunnions of the rollers run in the lubricant, substantially as described.

4. In a car-truck, the roller-frame or boxes open at the top, in combination with the turn-table carrying the top of the frame or boxes and having its edge turned downward so as to embrace and depend below the upper edge of said roller-frame or boxes, substantially as described.

5. In a car-truck, the turn-table having the peripheral flange 20 and provided with angular plates 23, whose vertical branches are designed to engage the under side of the framework of the car, and a transverse plate 25 connecting the horizontal portions of the plates 23, and the king-bolt 29, substantially as described.

6. The combination with the axles, wheels, and journal-boxes for the reception of the axles, of angle-beams mounted upon the boxes, a series of springs located on the beams, a roller-frame provided with seats for receiving and located upon the springs, rollers journaled in the frame, a superimposed turn-table having an external flange embracing the frame, a connecting-plate between the angular frames, vertically opposite perforations formed in the turn-table and connecting-plate, and a king-bolt passed through the turn-table and connecting-plate of the beams, substantially as described.

7. The combination with the axles, wheels, journal-boxes, angle-beams secured to the boxes, and a transverse connecting-plate for the beams, of a roller-frame adapted to contain oil, a turn-table arranged thereover, rollers journaled in the frame and supporting the turn-table, angle-bars bolted to the upper side of the turn-table, a reinforcing-plate connecting the angle-plates and located upon the turn-table, a lower reinforcing-plate or washer between the angle-beams, openings formed in the reinforcing-plates, the beam connecting-plate and the turn-table, and a king-bolt passed therethrough, substantially as described.

8. The combination with the axles, wheels and journal-boxes of a truck, of opposite parallel longitudinally-disposed angle-beams having their upper or horizontal sides bolted to the boxes, and their vertical portions embracing the boxes, and provided with perforations, and a connecting-plate between said beams, of a superimposed circular frame having a continuous oil-groove upon its upper side, and provided at intervals with pairs of bearings, a series of rollers having their trunnions loosely journaled in the bearings and extending above the upper edges of said walls, a turn-table located over and resting upon the rollers and having a depending flange embracing the frame, guide-pins depending from the frame and passing through the perforations in the beams, angle-bars mounted on the turn-table, a connecting-plate between the angle-plates, bolt-receiving openings formed in the turn-table, connecting-plate, and the connecting-plate between the beams, a king-bolt passed through the openings, and an oil-perforation formed in the turn-table above the groove, substantially as described.

9. The combination with the axles, wheels, boxes and angle-beams, of a superimposed circular frame having an oil-groove and provided at intervals with bearings, rollers journaled in the bearings, springs interposed between the frame and beams, and a turn-table swiveled on the rollers, substantially as described.

In testimony that I claim the foregoing as my own I have hereto affixed my signature in the presence of two witnesses.

DANIEL KING.

Witnesses:
C. L. FOLLANSBEE,
JAMES ARRINGTON.